United States Patent
Milum

(10) Patent No.: US 8,349,180 B2
(45) Date of Patent: Jan. 8, 2013

(54) FILTER ELEMENTS AND ASSEMBLIES

(75) Inventor: Mark Milum, Waterlooville (GB)

(73) Assignee: Pall Corporation, Port Washington, NY (US)

( * ) Notice: Subject to any disclaimer, the term of this patent is extended or adjusted under 35 U.S.C. 154(b) by 408 days.

(21) Appl. No.: 12/439,864

(22) PCT Filed: Aug. 23, 2007

(86) PCT No.: PCT/US2007/076627
§ 371 (c)(1),
(2), (4) Date: May 17, 2010

(87) PCT Pub. No.: WO2008/030707
PCT Pub. Date: Mar. 13, 2008

(65) Prior Publication Data
US 2010/0219116 A1 Sep. 2, 2010

Related U.S. Application Data

(60) Provisional application No. 60/842,026, filed on Sep. 5, 2006.

(51) Int. Cl.
*B01D 29/96* (2006.01)
*B25G 3/16* (2006.01)
*F16B 2/02* (2006.01)

(52) U.S. Cl. ........ 210/232; 210/236; 210/435; 210/443; 210/446; 210/454; 210/455; 403/348; 403/439; 403/350

(58) Field of Classification Search ............. 210/232, 210/236, 435, 443, 446, 454, 455, 440, 450; 24/663; 403/348, 349, 350; 55/490, 493
See application file for complete search history.

(56) References Cited

U.S. PATENT DOCUMENTS

| | | | | |
|---|---|---|---|---|
| 4,877,521 A | * | 10/1989 | Petrucci et al. | 210/171 |
| 5,045,192 A | * | 9/1991 | Terhune | 210/232 |
| 5,300,223 A | * | 4/1994 | Wright | 210/232 |
| 5,660,063 A | * | 8/1997 | Lee et al. | 68/18 F |
| 5,695,633 A | | 12/1997 | Ernst et al. | |
| 5,770,065 A | | 6/1998 | Popoff et al. | |
| 5,826,854 A | * | 10/1998 | Janvrin et al. | 251/149.9 |
| 5,956,822 A | * | 9/1999 | Brieden et al. | 24/662 |
| 6,015,492 A | * | 1/2000 | Popoff et al. | 210/238 |
| 6,458,269 B1 | * | 10/2002 | Bassett et al. | 210/119 |

(Continued)

FOREIGN PATENT DOCUMENTS

DE 34 05 929 A1 6/1984

(Continued)

*Primary Examiner* — Nam Nguyen
*Assistant Examiner* — Clare Perrin
(74) *Attorney, Agent, or Firm* — Leydig, Voit & Mayer, Ltd.

(57) ABSTRACT

Fluid filter elements and assemblies are used to separate contaminants from a fluid, such as oil or fuel, prior to reaching an engine. Fluid filter assemblies may comprise a housing, a filter element, and a filter head. The filter element may be disposed within the filter housing and enclosed by the filter head. Fluid enters the housing and passes through the filter element. The fluid may then exit the assembly. A connector may be used to connect the filter element to the filter head to ensure proper installation and simplify removal of a fouled filter element. The connector permits removable coupling of the filter element to the filter head and resists unintentional disengagement to securely couple the filter element to the filter head.

18 Claims, 8 Drawing Sheets

U.S. PATENT DOCUMENTS

| | | | |
|---|---|---|---|
| 6,939,464 B1* | 9/2005 | Jiang et al. | 210/232 |
| 7,763,170 B2* | 7/2010 | Bassett et al. | 210/232 |
| 7,871,515 B2* | 1/2011 | Brandt et al. | 210/232 |
| 7,955,502 B2* | 6/2011 | Greco et al. | 210/234 |
| 2003/0132158 A1* | 7/2003 | Clausen et al. | 210/450 |
| 2004/0154975 A1 | 8/2004 | Girondi | |
| 2005/0079011 A1* | 4/2005 | Groff et al. | 403/348 |
| 2005/0123346 A1* | 6/2005 | Nakamura et al. | 403/348 |
| 2009/0114584 A1* | 5/2009 | Reid | 210/232 |
| 2009/0200221 A1* | 8/2009 | Hacker et al. | 210/232 |

FOREIGN PATENT DOCUMENTS

| | | |
|---|---|---|
| WO | WO 02/100511 A1 | 12/2002 |

* cited by examiner

FILTER ELEMENTS AND ASSEMBLIES

DISCLOSURE OF THE INVENTION

The invention relates to filter elements and assemblies used to separate contaminants from a fluid, such as oil or fuel, prior to reaching an engine. Fluid filter assemblies may comprise a housing, a filter element, and a filter head. The filter element may be disposed within the filter housing and enclosed within the housing by the filter head. Fluid enters the housing and passes through the filter element. The filter element has a filter medium through which the fluid passes. The filter medium restricts the passage of contaminants of a particular size from flowing through the filter medium.

As the filter element collects contaminants over time, it becomes more difficult for fluid to pass through the filter element. Thus, filter elements have a useful life and require replacement. A connector may be used to connect the filter element to the filter head to ensure proper installation and simplify removal of a fouled filter element. The connector permits removable coupling of the filter element to the filter head and resists unintentional disengagement to securely couple the filter element to the filter head.

In particular, the present invention relates to a filter element for separating impurities from a fluid. The filter element comprises a filter medium and an end cap. The filter medium may have an end. The end cap may be coupled to the end of the filter medium and may include a filter head connector configured to removably connect the filter element to a filter head. The filter head connector may have a release portion and a retainment portion. The release portion may permit axial movement between the filter head connector and the filter head, and the retainment portion may substantially prevent disengagement of the filter head connector from the filter head. The filter head connector may resist rotational movement between the filter head and the filter head connector from the retainment portion to the release portion.

In accordance with another aspect of the invention, the filter element may comprise a filter medium and an end cap. The filter medium may have an end. The end cap may be coupled to the end of the filter medium and may include a connector and a base. The connector may have a proximate end near the base, a distal end spaced from the base, a guide surface, and a recessed surface. The guide surface may extend the entire length of the connector from the distal end to the proximate end, and at least a portion of the guide surface may angle outward from the distal end toward the proximate end. The recessed surface may be disposed adjacent to the guide surface.

In accordance with another aspect of the invention, the filter element may comprise a filter medium and an end cap. The filter medium may have a generally cylindrical configuration and may include an end. The end cap may be coupled to the end of the filter medium and may include a connector. The connector may extend away from the filter medium and may include a distal end, a guide surface, an abutment which is circumferentially spaced from the guide surface, and a recessed surface which extends circumferentially from the guide surface to the abutment. At least a portion of the guide surface may have a slope which angles radially outward from a first region near the distal end to a second region spaced from the distal end, and the recessed surface may be spaced radially inward from the second region of the guide surface the entire circumferential distance between the guide surface and the abutment.

The present invention also relates to a filter assembly for separating impurities from a fluid. The filter assembly may comprise a filter housing and a filter element. The filter housing may include a filter head having a connector extension. The filter element may include a filter medium having an end and an end cap coupled to the end of the filter medium. The end cap may include a connector having a release portion and a retainment portion. The filter element may be removably connectable to the filter head by slidingly engaging the release portion with the connector extension and rotating the connector and the filter head relative to one another to engage the connector extension with the retainment portion. In other embodiments, the filter element may include the connector extension and the filter head may include the connector.

In accordance with another aspect of the invention, the filter assembly may comprise a filter housing and a filter element. The filter housing may include a filter head having a connector extension. The filter element may include a filter medium having an end and an end cap coupled to the end of the filter medium. The end cap may include a connector having a recessed surface. The connector extension may be removably received in the recessed surface by relative rotational movement between the connector and the filter head. A retainer may be configured to retain the connector extension in the recessed surface. In other embodiments, the filter element may include the connector extension and the filter head may include the connector.

DETAILED DESCRIPTION OF THE INVENTION

Figure 1:
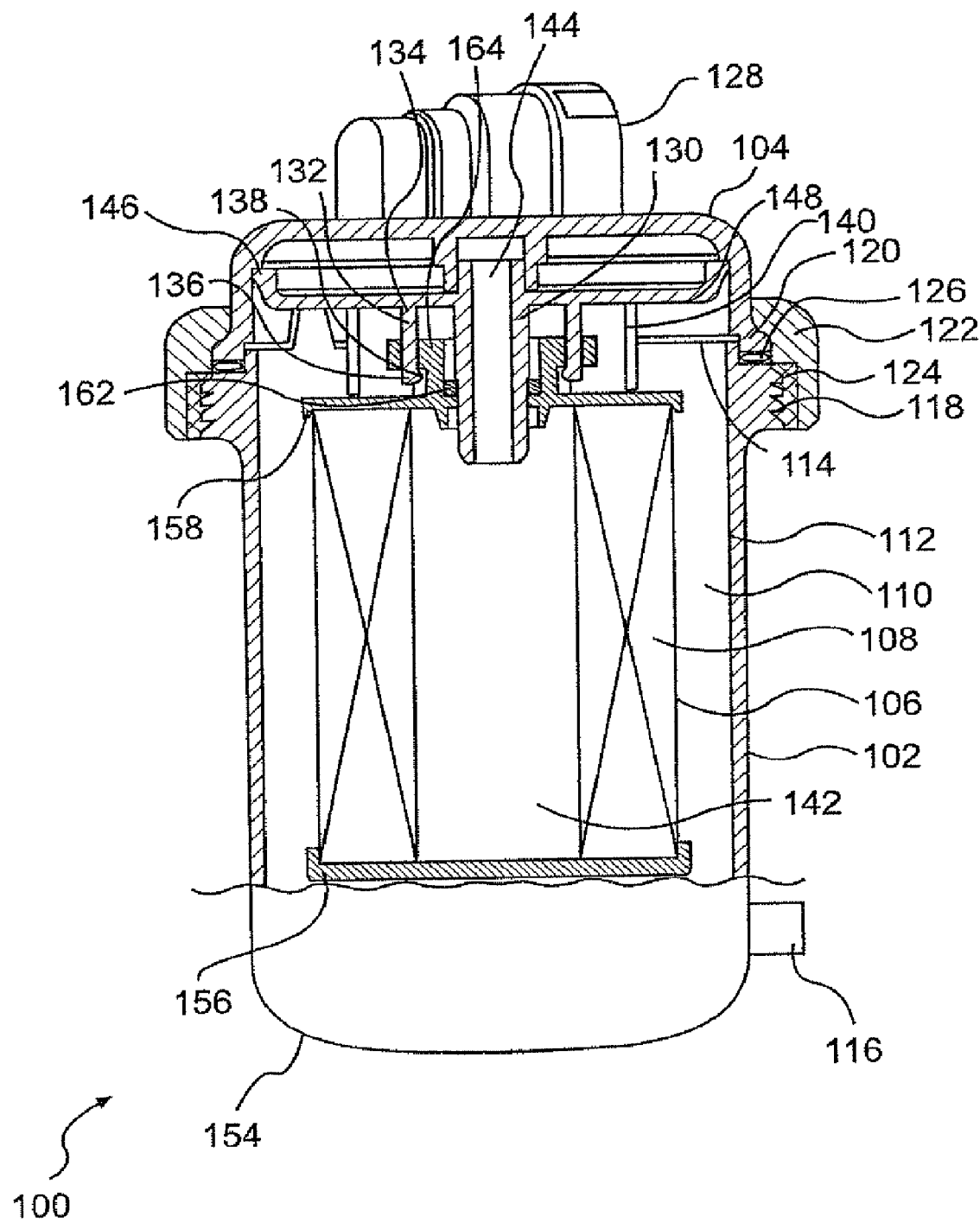
FIG. 1 is a cross-sectional view of a filter assembly.

Turning to the figures, wherein like shown or described features may represent like elements, a fluid filter assembly 100 for separating contaminates from a fluid is shown in FIG. 1. The fluid filter assembly 100 is disposed such that prior to a fluid reaching an engine, such as fuel or oil, contaminants may be removed from the fluid. The fluid filter assembly 100 may comprise a housing 102, a filter head 104, and a filter element 106. As will be described in further detail below, the filter element 106 may be disposed within the housing 102 and enclosed within the housing 102 by the filter head 104. The filter element 106 generally has a limited useful life before contaminants filtered by the filter element 106 accumulate in the filter medium 108 of the filter element 106 to a sufficient extent to undesirably restrict the passage of fluid therethrough and increase the pressure drop across the filter element 106. Thus, the filter element 106 is removably connectable to the filter head 104 such that a fouled filter element 106 can be detached from the filter head 104 for disposal and replaced with a new filter element 106.

The housing 102 may comprise a body 110 having a generally cylindrical interior surface 112 and an open mouth 114 for receiving the filter element 106. The housing 102 may also comprise a fluid inlet 116 whereby the fluid is received into the housing 102 for filtering. The housing 102 may further comprise a threaded surface 118 disposed near the open mouth 114 for receiving and securely coupling the filter head 104 to the housing 102.

The filter head 104 similarly may comprise a threaded surface (not shown) for engaging the threaded surface 118 of the housing 102 such that the filter head 104 may be securely coupled to the housing 102 by rotating the filter head 104 relative to the housing 102. In other embodiments, such as shown in FIG. 1, the filter head 104 may have a securement flange 120 around the perimeter of the filter head 104. A coupling ring 122 may be provided having threads 124 for rotationally engaging the threads 118 on the housing 102. When the coupling ring 122 is disposed over the filter head 104, the coupling ring 122 grips the securement flange 120. As the coupling ring 122 is rotated, it clamps the securement flange 120 to the housing 102. A seal 126 may be disposed between the filter head 104 and the housing 102 to prevent leakage and maintain the pressure within the filter assembly 100.

Figure 7:
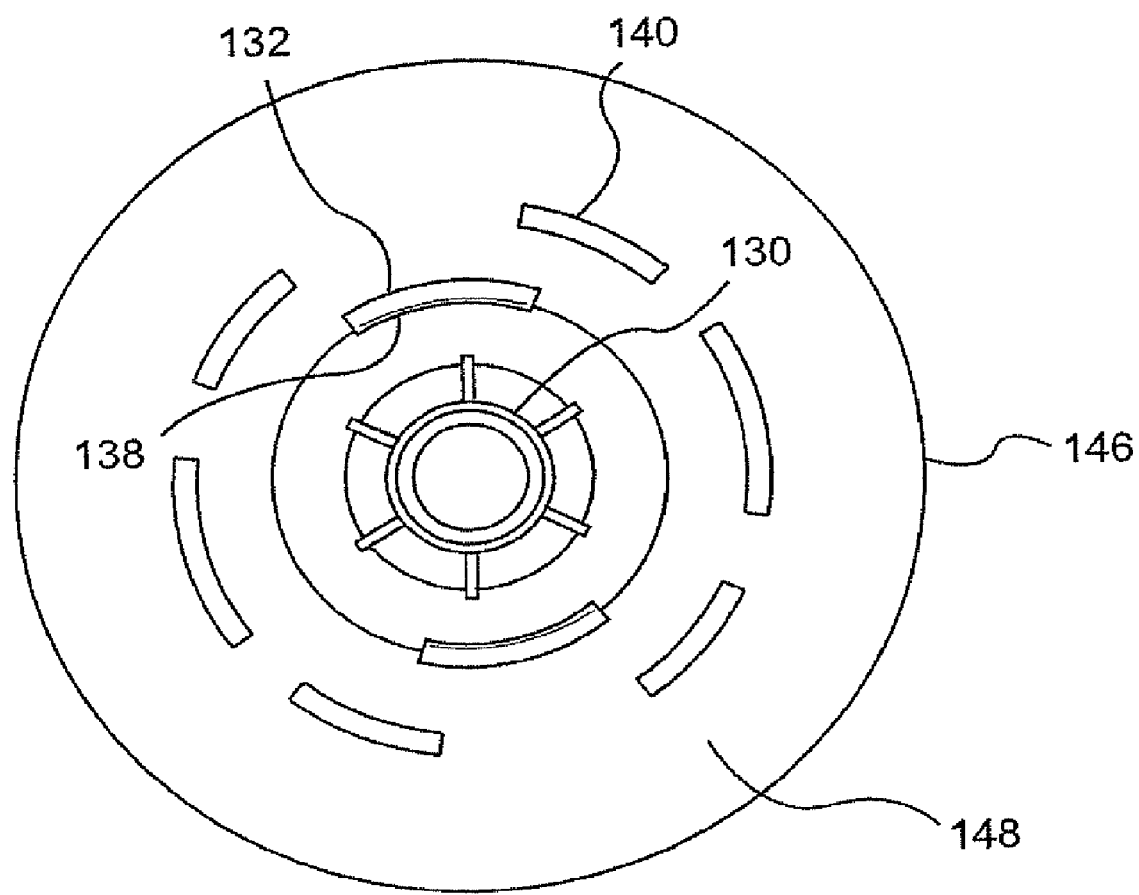
FIG. 7 is a bottom view of a filter head disc member.

Referring to FIGS. 1 and 7, the filter head 104 may comprise a fluid outlet 128 for permitting the flow of filtered fluid to exit the housing 102 and proceed to the engine. An outlet feeder tube 130, which fluidly communicates with the fluid outlet 128, may extend from the filter head 104 for insertion into the interior of the filter element 106. The outlet feeder tube 130 transports filtered fluid from the interior of the filter element 106 to the fluid outlet 128. As shown in FIG. 1, the outlet feeder tube 130 may have an elongate generally cylindrical configuration with an aperture 144 disposed therethrough to permit fluid to flow through the outlet feeder tube 130.

The filter head 104 may further comprise an extension member 132 extending from the filter head 104. The extension member 132 may comprise an elongate body projecting outward from the filter head 104. The extension member 132 comprises a proximal end 134 near the filter head 104 and a distal end 136 disposed away from the filter head 104. A shaped end 138 may be disposed near the distal end 136 of the extension member 132 for engaging the filter element 106. The shaped end 138 may have a generally semi-circular cross-sectional shape. It will be appreciated, however, that the extension member 132 and shaped end 138 may have any suitable shape and/or size.

The filter head 104 may further comprise one or more spacers 140 extending from the filter head 104. Similar to the extension member 132, the spacer 140 may have an elongate body. The spacers 140 help to maintain a minimum distance between the filter head 104 and the filter element 106.

The extension members 132, the spacers 140, and the outlet feeder tube 130 may project directly from the filter head 104, or in other embodiments, as shown in FIGS. 1 and 7-10, they may project from a filter head disc member 146. The filter head disc member 146 is securely attached to the filter head 104 in any suitable manner. For purposes of explanation, however, the filter head disc member 146 is shown in FIGS. 7-10 as separated from the filter head 104. The filter head disc member 146 may have a surface 148 that the extension members 132 and spacers 140 extend therefrom. The outlet feeder tube 130 may be centrally disposed on the filter head disc member 146 and extends through the filter head disc member 146.

Figure 2:
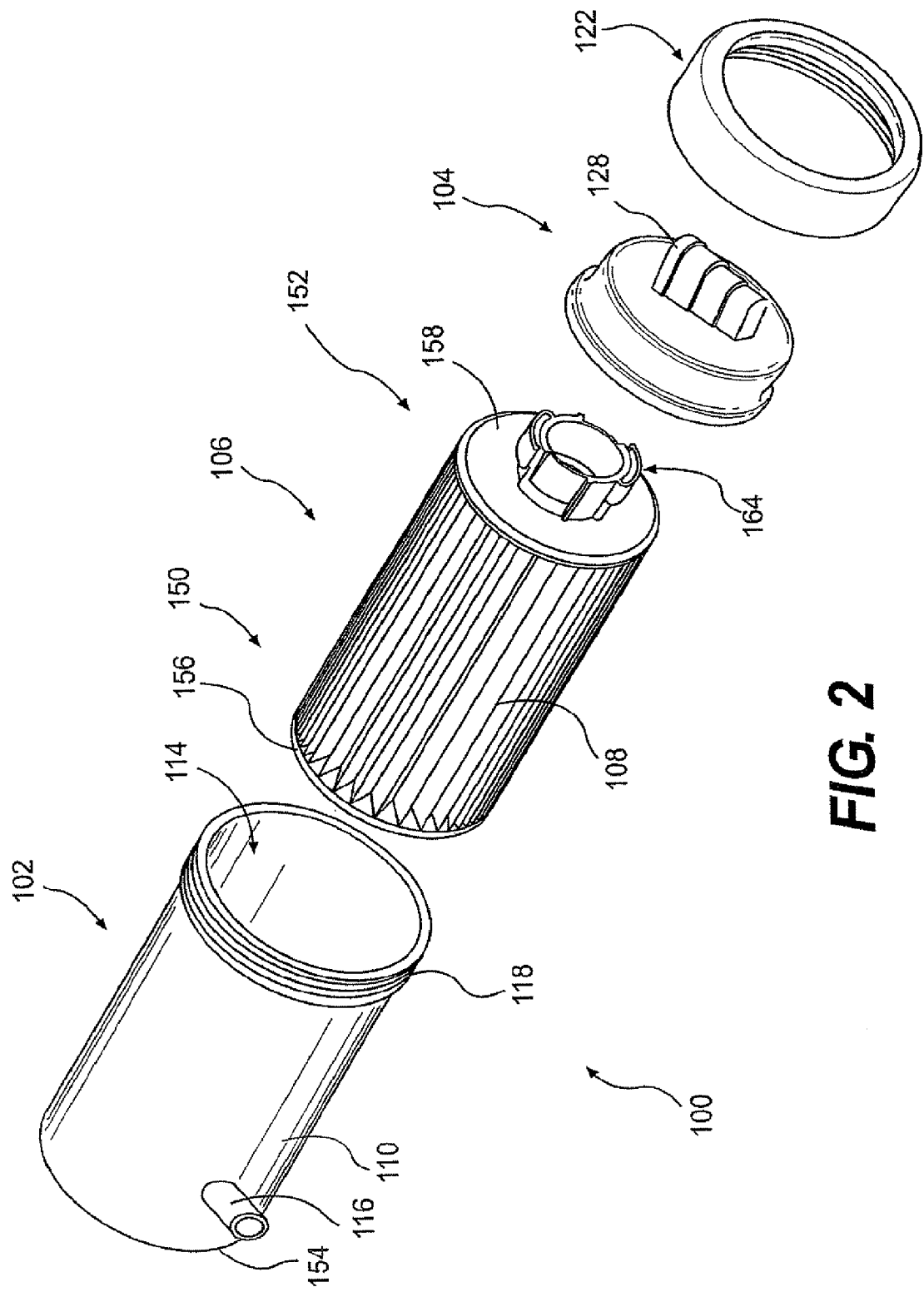
FIG. 2 is an exploded view of the filter assembly of FIG. 1.
Figure 3:
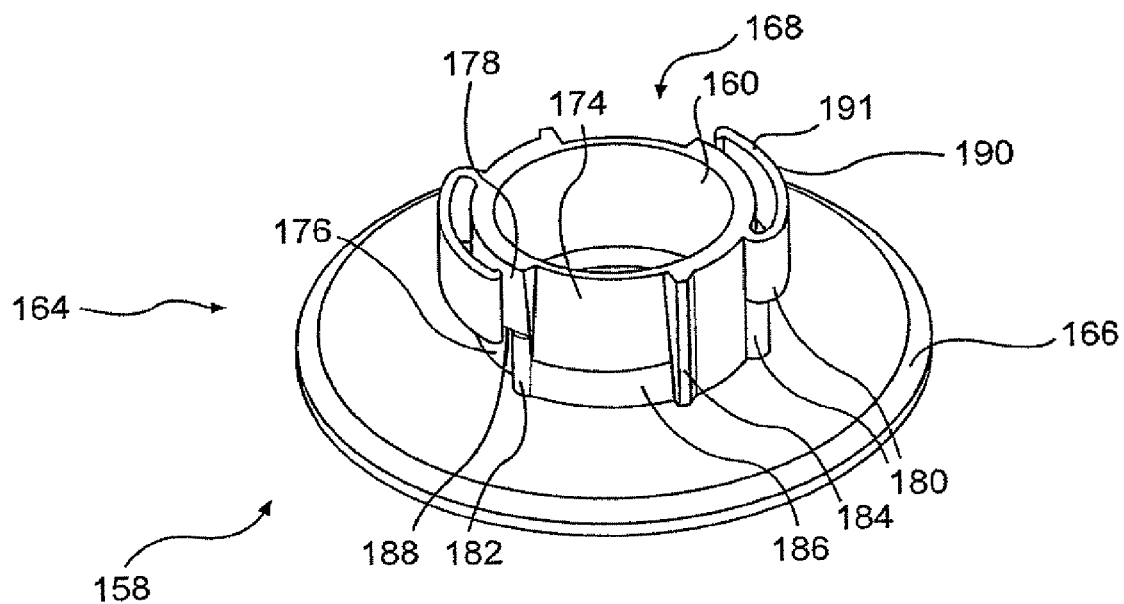
FIG. 3 is a perspective view of a filter head connector.

Turning to FIG. 2, the filter element 106 comprises a generally cylindrical body having a first end 150 and a second end 152. The second end 152 of the filter element 106 may be removably attachable to the filter head 104. The first end 150 of the filter element 106 may be disposed near the base 154 of the housing 102 when inserted into the housing 102. It will be appreciated that the filter element 106 may be of any suitable shape and size. It will also be appreciated that the filter element 106 may be constructed in any suitable manner.

The filter element 106 comprises a filter medium 108. The filter medium 108 permits fluid to flow therethrough while restricting the passage of contaminants. The filter medium 108 may be pleated to enhance the strength of the filter medium 108 and increase the amount of surface area of the filter medium 108 exposed to the fluid. The pleats may extend inwardly or outwardly in a radial direction or in a curved, arcuate, angled, or straight non-radial direction. The filter medium 108 may be of any suitable shape and may be constructed of any suitable material including, but not limited to, a permeable or semipermeable membrane or a fibrous sheet, including being constructed of materials such as metal, natural or synthetic polymers, or a ceramic or glass. Further, it will be appreciated that the filter medium 108 may have any suitable number of layers and/or additional layers, such as drainage layers or cushioning layers, may be pleated with the filter medium 108.

The filter element 106 may comprise a core and/or cage (not shown) disposed on the interior and/or exterior surface of the filter element 106. The core and/or cage may extend from the first end 150 of the filter element 106 to the second end 152 of the filter element 106 and may be at least partially cylindrical to abut at least a portion of the interior or exterior of the filter medium 108, respectively. The core and/or cage, if present, comprise a structure suitable to permit the passage of fluid therethrough. For example, the core and/or cage may comprise a plurality of apertures to permit fluid to flow therethrough. The core and/or cage may provide support to the filter element to resist forces exerted thereon during the filtration process.

The filter element 106 may comprise a first end cap 156 disposed at the first end 150 of the filter element 106 and a second end cap 158 disposed at the second end 152 of the filter element 106. The end caps 156, 158 may abut and encompass the respective ends 150, 152 of the filter medium 108. The end caps 156, 158 may be bonded to the filter medium 108. For example, the end caps 156, 158 may be heat bonded or adhesively bonded to the ends of the pleated filter medium 108. However, it will be appreciated that the end caps 156, 158 may be secured to the filter medium 108 in any suitable manner. In some embodiments, the filter element 106 may not have an end cap or may have only a single end cap.

As shown in FIGS. 3-6, the second end cap 158 may comprise an aperture 160 to permit filtered fluid to exit the interior 142 of the filter element 106 through the aperture 160 and into the filter head 104. The fluid can then exit the filter assembly 100 through the fluid outlet 128 in the filter head 104. This may be accomplished via the outlet feeder tube 130 which may project through the aperture 160 and into the interior 142 of the filter element 106 when the filter element 106 is attached to the filter head 104. As shown in FIG. 1, a seal 162 may be disposed between the second end cap 158 and the outlet feeder tube 130 to prevent the contamination of the filtered fluid with unfiltered fluid and to maintain the pressure differential between inside the filter element 106 and outside the filter element 106.

The filter element 106 may be releasably secured to the filter head 104. As mentioned above, filter elements 106 have a finite useful life, and thus, require replacement when the useful life has expired. Therefore, an advantage of being able to releasably secure the filter element 106 to the filter head 104 is that after the filter housing 102 is removed from the filter head 104, a spent filter element 106 may be easily removed from the filter head 104 and a new filter element 106 may be readily installed on the filter head 104.

The filter element 106 may be securely attachable to the filter head 104 such that it does not unintentionally detach from the filter head 104. As shown in FIGS. 1 and 2, in order to securely couple the filter element 106 to the filter head 104, the filter element 106 may comprise a filter head connector 164. The filter head connector 164 may be formed as part of an end cap, such as 158, or may be attached to an end cap. Referring to FIGS. 3-6, the filter head connector 164 may comprise a base 166 and a generally cylindrical connector portion 168. The base 166 may be disc-shaped and may extend radially from a proximal end 170 of the connector portion 168. The base 166 forms part of or is connected to the second end cap 158. As discussed in further detail below, the connector portion 168 may be engaged by the extension member 132 of the filter head 104 to couple the filter element 106 to the filter head 104. For simplification and for purposes of discussion, the filter head connector 164 and second end cap 158 are shown and described as essentially the same component, however, it will be appreciated that the filter head connector may be a separate component coupled to the end cap as mentioned above. Therefore, references and discussion directed to the filter head connector 164 or the second end cap 158 may be applicable to the other.

The connector portion 168 may comprise a guide surface 174, a recessed portion 176, a locking portion 178, and an abutment 180. The guide surface 174 may begin near a distal end 172 of the connector portion 168 and may ramp outward from the distal end 172 to the proximal end 170 such that the diameter of the guide surface 174 is larger near the proximal end 170 than the distal end 172. The ramped portion of the guide surface 174 may level out into a rest 186 near the proximal end 170. The recessed portion 176 is disposed circumferentially adjacent to the guide surface 174 near the proximal end 170 with a rounded ridge 182 disposed therebetween. The rounded ridge 182 is discussed in further detail below.

The abutment 180 extends radially outward from the connector portion 168 a distance sufficient to act as a stop to prevent the extension member 132 from rotating beyond the abutment 180. A similar guide abutment 184 may be disposed near the guide surface 174. The guide abutment 184 may circumferentially oppose the abutment 180 to provide a rotational restriction for the extension member 132 and may operate in combination with the guide surface 174 to provide a discrete path of a desired width for the extension member 132 to slidingly engage the connector portion 168.

The locking portion 178 and the recessed portion 176 are disposed axially relative to one another along the connector portion 168 such that a hard transition is formed therebetween. The hard transition is formed by the difference in outer diameters between the recessed portion 176 and the locking portion 178 resulting in a ledge 188 because the recessed portion 176 is smaller in diameter. Unlike the rounded ridge 182 between the recessed portion 176 and the guide surface 174, the ledge 188 between the recessed portion 170 and locking portion 178 may be disposed at right angles relative to the recessed portion 176 and locking portion 178.

Figure 4:
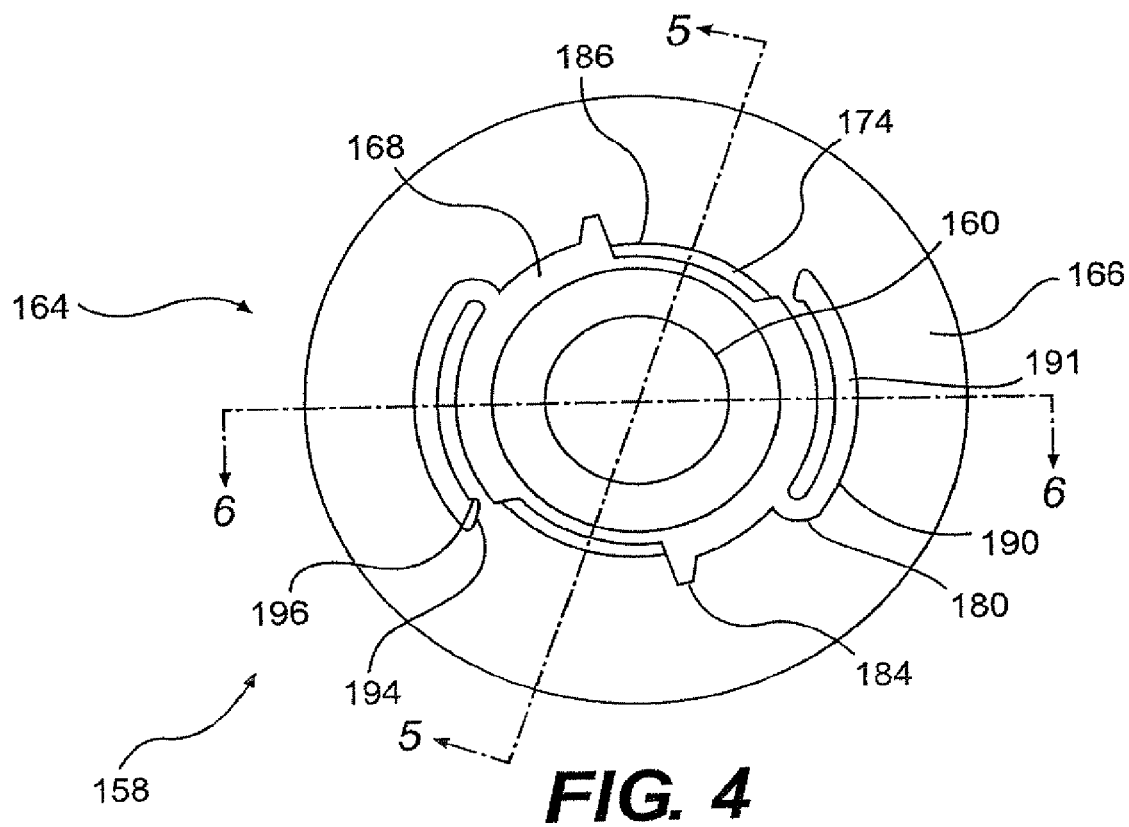
FIG. 4 is a top plan view of the filter head connector of FIG. 3.
Figure 5:
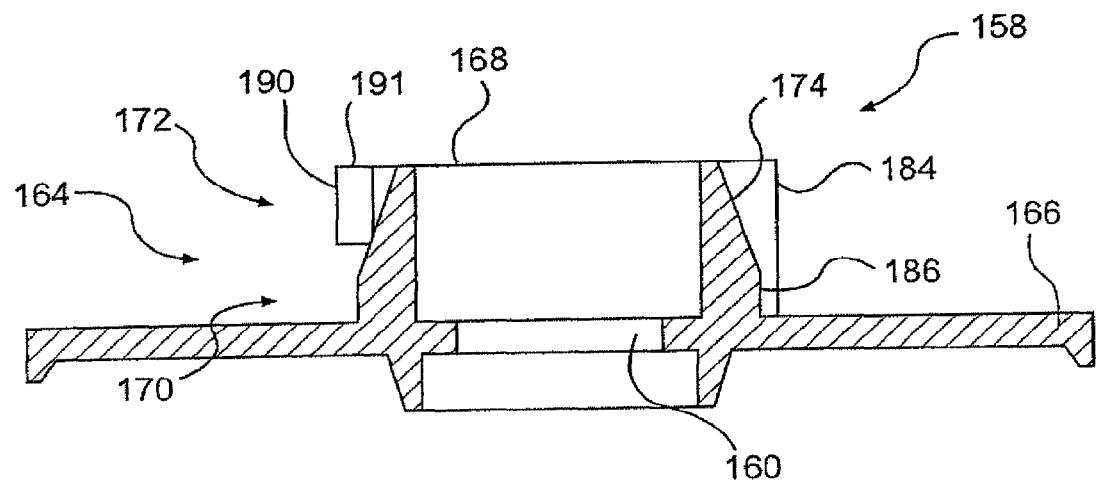
FIG. 5 is a cross-sectional view taken through line 5-5 of the filter head connector of FIG. 4.
Figure 6:
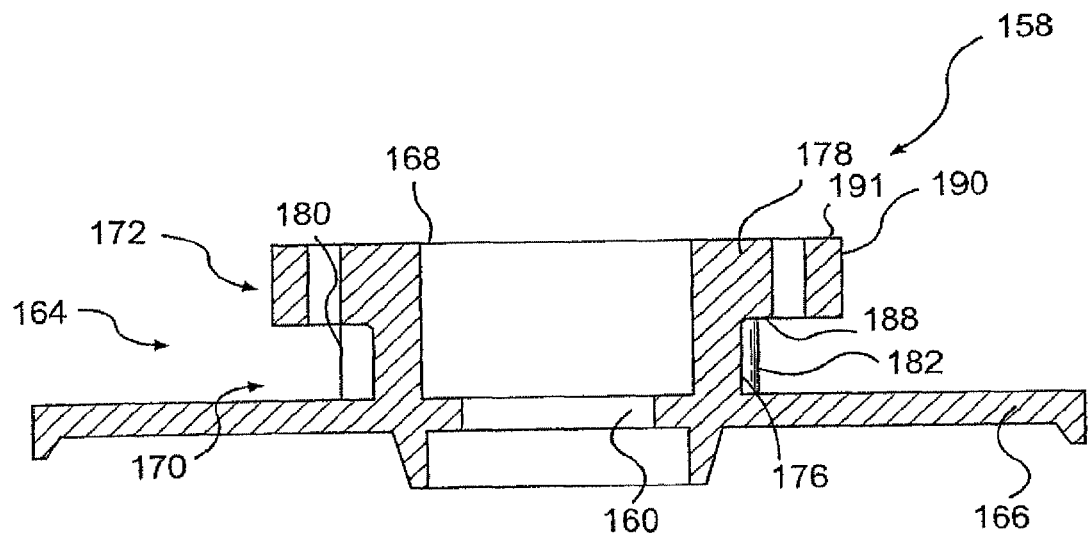
FIG. 6 is a cross-sectional view taken through line 6-6 of the filter head connector of FIG. 4.

Referring still to FIGS. 3-6, the connector portion 168 may comprise one or more retainers or clips 190. Each clip 190 may be arcuate in shape and may have a radius such that the clip runs generally parallel to the connector portion 168. The clip 190 may be coupled to the connector portion 168 along the distal half of the connector portion 168 and axially adjacent to the abutment 180. The clip 190 may include a circumferentially extending arm 191 that may be connected to the connector portion 168 at one end and at the other end may comprise a half-arrowhead shaped end. The shaped end may not be directly coupled with the connector portion 168, but instead may be radially spaced away from the connector portion 168 to form a gap therebetween. As shown in FIG. 4, the half-arrowhead shaped end may have a lead-in edge 194 and a backside edge 196 for contacting the extension member 132. It will be appreciated that any suitable number of clips 190 or other similar suitable structures may be provided.

Figure 8:
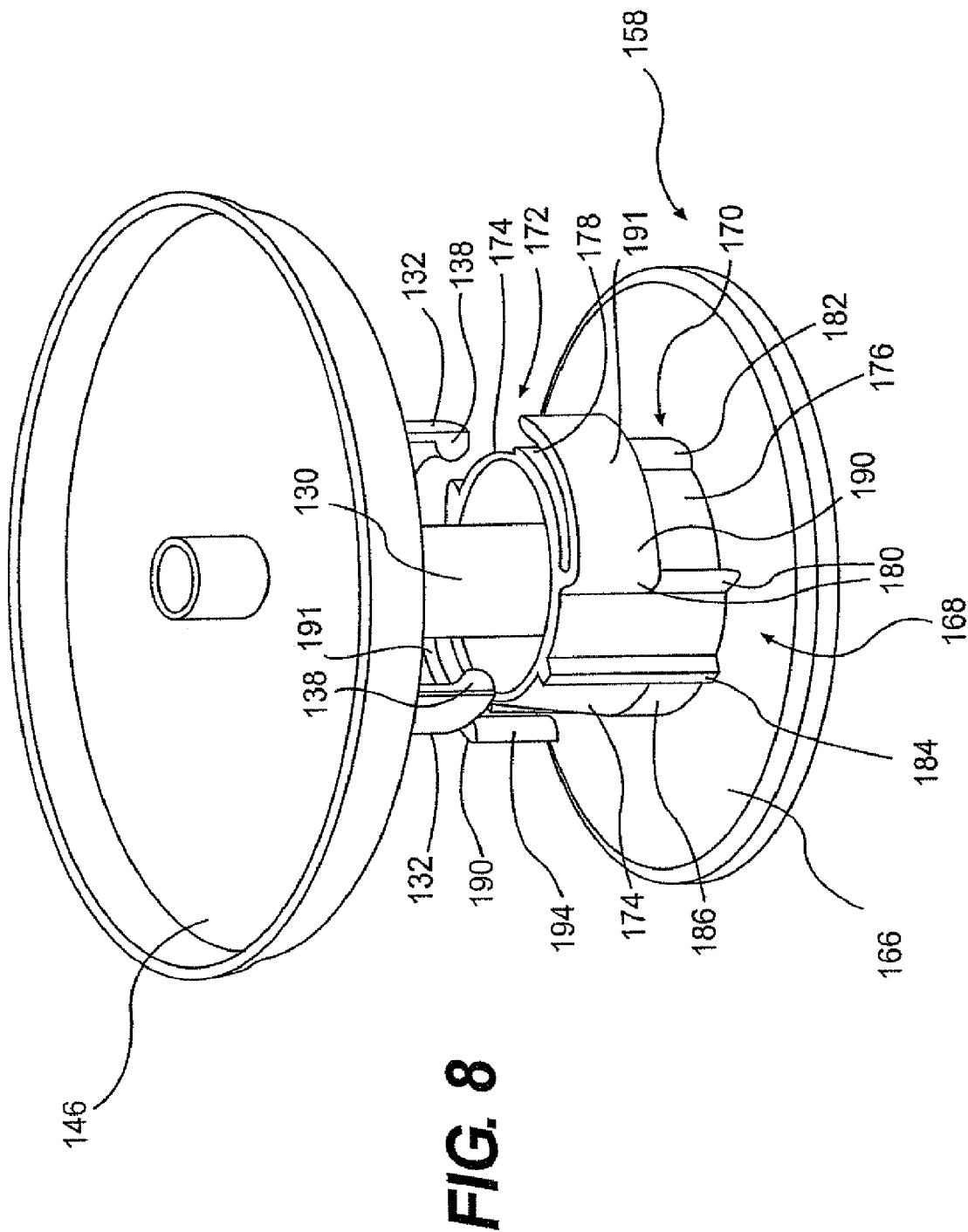
FIG. 8 is an exploded perspective view of the filter head disc member of FIG. 7 and the filter head connector of FIG. 3.
Figure 9:
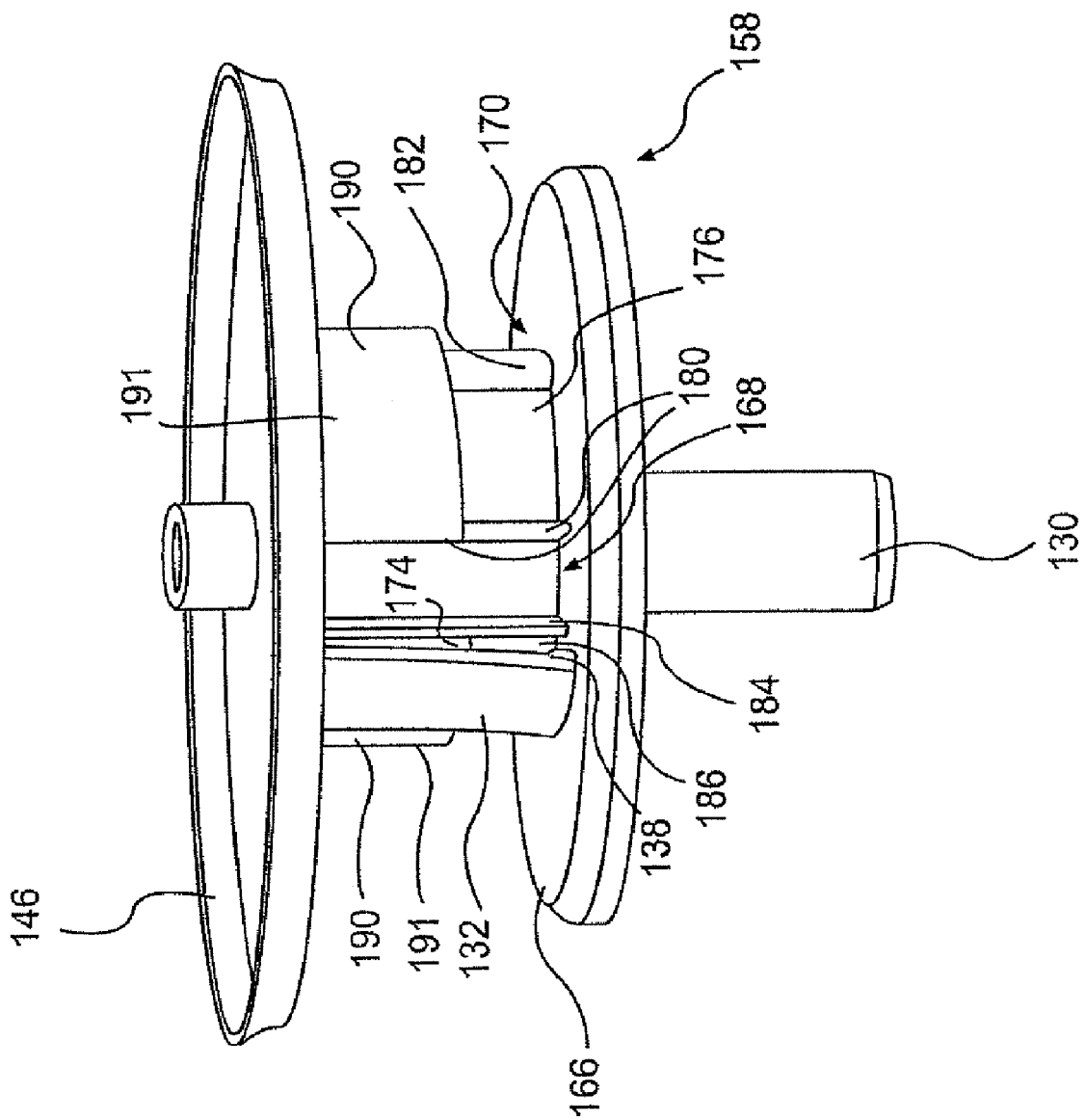
FIG. 9 is a perspective view showing the filter head cap of FIG. 7 and the filter head disc member of FIG. 3 before rotation into the secured orientation.
Figure 10:
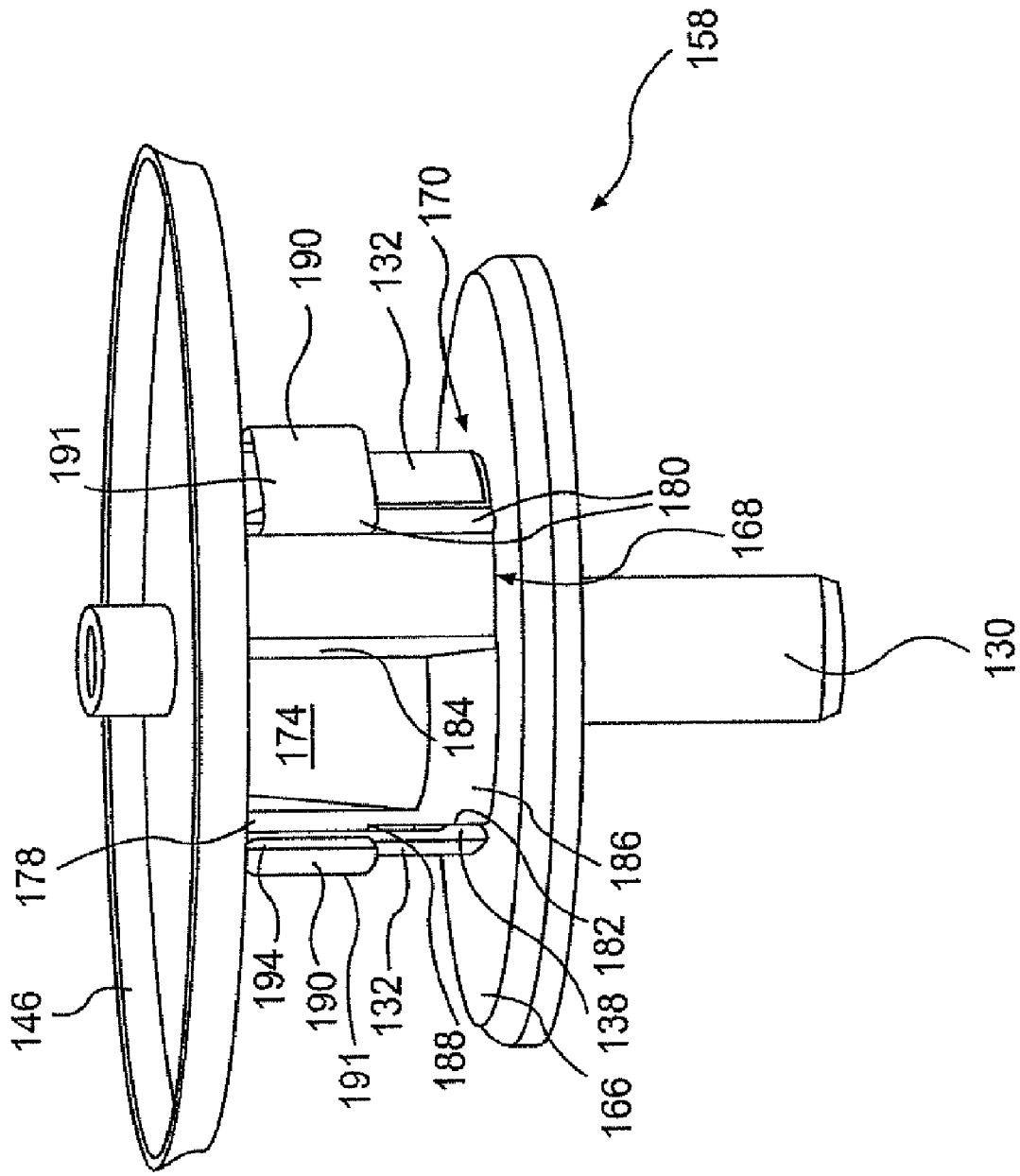
FIG. 10 is a perspective view showing the filter head disc member of FIG. 7 and the filter head connector of FIG. 3 rotated relative to one another into the secured orientation.

FIGS. 8-10 illustrate stages of connecting the filter head 104 to the filter element 106. For visualization purposes, the spacers 140 are not shown in these figures. Furthermore, for simplification and explanation, the second end cap 158/filter head connector 164 is shown as detached from the filter element 106 and the filter head disc member 146 is shown as detached from the filter head 104. Therefore, it will be appreciated that references made or shown regarding the filter element 106 may apply to the second end cap 158/filter head connector 164 and vice versa. Similarly, references made or shown regarding the filter head 104 may apply to the filter head disc member 146 and vice versa.

Turning to FIG. 8, in order to couple the filter element 106 to the filter head 104, the extension members 132 of the filter head 104 are aligned with the guide surfaces 174 of the connector portion 168. The distal ends of the guide surfaces 174 form the smallest external diameters of the connector portion 168. Thus, given the positions of the extension members 132 on the filter head 104, the guide surfaces 174 operate as the only entry points for receiving the extension members 132. The outer diameter of the remaining distal edges of the connector portion 168 are large enough such that they abut the extension members 132 if the filter head 104 and filter element 106 are moved axially toward one another at positions other than the guide surfaces 174. It will be appreciated that any suitable number of extension members 132 may be received by any suitable number of guide surfaces 174.

As the filter head 104 and the filter element 106 are moved axially toward one another, the shaped ends 138 of the extension members 132 may slide along the guide surface 174. As shown in FIG. 9, the extension members 132 may bend radially outward as they approach the proximal end 170 of the connector portion 168. The shaped ends 138 may then reach the rest position 186 on the guide surface 174. The filter element 106 and filter head 104 are prevented from moving any closer to one another by the spacers 140 and/or the extension members 132 contacting the base 166 of the filter head connector 164. At this position, the filter element 106 and the filter head 104 are still separable by pulling them away from one another.

The filter element 106 and the filter head 104 may then be rotated relative to one another to securely couple these components to one another. For example, the filter head connector 164 may be rotated clockwise relative to the filter head 104. In other embodiments, the filter head connector 164 may be rotated counter-clockwise relative to the filter head 104. When rotating, the lead-in edges 194 of the clips 190 contact the extension members 132, and the clips 190 may bend outward as appropriate to slide along the outer surface of the extension members 132. As the filter head connector 164 continues to rotate, the shaped ends 138 of the extension members 132 will slide over the rounded ridges 182 and enter the recessed portions 176 as shown in FIG. 8. The extension members 132 having previously been bent by the guide surfaces 174 will at least partially move radially inward back to or near its pre-attachment orientation as it moves into the recessed portion 176.

The user may be able to detect that the shaped ends 138 are in the recessed portion because the shaped portions may make a clicking noise, the user will not be able to rotate the filter head connector 164 any further because the shaped ends 138 will be stopped from further rotation by the abutments 180, and counter-clockwise rotation is resisted by the rounded ridges 182. Furthermore, as the last portions of the extension members 132 slide past the rounded ridges 182, a small rotational force may exist to allow the user to feel when the shaped ends 138 have engaged the recessed portions 176. Requiring the user to rotate the filter element 106 and filter head 104 relative to one another is beneficial because it is intuitive for users to rotate components to engage them.

When the extension members 132 enter the recessed portions 176, the lead-in edges 194 of the clips 190 may pass beyond the width of the respective extension members 132 and the backside edges 196 may abut the sides of the extension members 132. The clips 190, similar to the extension members 132, may move radially inward to return at least partially to its pre-contact non-bent orientation.

The filter element 106 and the filter head 104 are now securely attached to one another. Axial separation of the filter element 106 and the filter head 104 is resisted by the ledges 188 at the intersection of the recessed portions 176 and the locking portions 178. The ledges 188 may contact the shaped ends 138 of the extension members 132 to act as a stop if axial separation is attempted. The clips 190 add further security to the connection by resisting radial movement of the extension members 132 which would necessarily take place if the extension members 132 were to pass over the locking portions.

Unintentional disengagement of the extension members 132 and the connector portions 168 is also resisted from rotational movement by the rounded ridges 182 and backside edges 196 of the clips 190. For example, the rounded ridges 182 resist rotational movement by contacting the shaped ends 138 of the extension members 132. Further, the backside edges 196 of the clips 190 resist rotational movement by gripping the sides of the extension members 132. This rotational restriction is sufficient to help resist unintentional disengagement, while permitting intentional disengagement when a user is prepared to separate the filter element 106 from the filter head 104.

To disengage the extension members 132 from the connector portion 168, the connector portion 168 may be rotated counter-clockwise. A force sufficient to slide the shaped ends 138 of the extension members 132 over the rounded ridges is necessary to force the shaped end out of the recessed portion 176. As the shaped ends 138 pass over the rounded ridges, the edges of the extension members 132 also slide along the angled backside edges of the clips 190 forcing the clips 190 to bend radially outward. The half-arrowhead ends of the clips 190 then slide across the extension members 132 as the connector portion 168 continues to rotate. The shaped ends 138 of the extension members 132 move onto the rests 186 of the guide surfaces 174 until they are stopped by the guide surface abutments 184. The filter element 106 may then be separated from the filter head 104 by moving these components axially away from one another. The shaped ends 138 will slide along the guide surfaces 174 and return to their original non-bent orientation as the shaped ends 138 separate from the guide surfaces 174 at the distal ends 172 of the connector portion 168.

It will be appreciated that the connector 164 may be used with any suitable filter element 106 and/or filter head 104. It will also be appreciated that the connector portion 168 may alternately be attached to the filter head 104 and the extension members 132 may alternately be attached to the filter element 106.

Filter elements and assemblies including removably attachable connector structures for securely coupling a filter element to a filter head have been disclosed herein.

Any references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor(s) for carrying out the invention. Variations of those preferred embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element rotatably connectable to a filter head having an extension member, the filter element comprising a filter medium having an end and an end cap coupled to the end of the filter medium, wherein the end cap includes a filter head connector having a cylindrical connector portion and a clip which extends parallel to the cylindrical connector portion, the clip including a circumferentially extending arm connected to the cylindrical connector portion at one end and at the other end having a first shaped end defining a gap between the clip and the connector portion, wherein the clip moves radially outwardly when said first shaped end of the clip contacts the outer surface of the extension member of the filter head and wherein the clip moves radially inwardly when said first shaped end of the clip passes beyond the width of the extension member, said first shaped end of the clip thereby resisting rotational movement of the extension member.

2. The filter element of claim 1 wherein the cylindrical connector portion includes a guide surface configured to axially receive the extension member of the filter head.

3. The filter element of claim 2 wherein the guide surface is circumferentially adjacent to said first shaped end of the clip.

4. The filter element of claim 2 wherein the guide surface includes a ramped portion.

5. The filter element of claim 1 wherein said first shaped end of the clip includes a lead-in edge and a backside edge for contacting the extension member of the filter head.

6. A filter assembly comprising a filter housing, the filter housing including a filter head having an extension member, the filter element disposed in the housing, the filter element comprising a filter medium having an end and an end cap coupled to the end of the filter medium, wherein the end cap includes a filter head connector having a cylindrical connector portion and a clip which extends parallel to the cylindrical connector portion, the clip including a circumferentially extending arm connected to the cylindrical connector portion at one end and at the other end having a first shaped end defining a gap between the clip and the connector portion, wherein the clip moves radially outwardly when said first shaped end of the clip contacts the outer surface of the extension member of the filter head and wherein the clip moves radially inwardly when said first shaped end of the clip passes beyond the width of the extension member, said first shaped end of the clip thereby resisting rotational movement of the extension member.

7. The filter assembly of claim 6 wherein the clip engages a portion of the extension member.

8. The filter assembly of claim 6 wherein the extension member has a second shaped end.

9. A filter assembly comprising a filter housing including a filter head and a filter element disposed in the filter housing and removably connected to the filter head, the filter element including a filter medium having an end and an end cap coupled to the end of the filter medium, wherein the filter head includes a first connector and the end cap includes a second connector and wherein at least one of the first connector and the second connector includes an extension member and the other of the first connector and the second connector includes a cylindrical connector portion, the cylindrical connector portion including a clip which extends parallel to the connector portion and includes a circumferentially extending arm connected to the connector portion at one end and at the other end having a first shaped end defining a gap between the clip and the connector portion, wherein the filter element and the filter head are coupled by rotating the filter element relative to the filter head, the clip bending radially outwardly when said first shaped end of the clip contacts the outer surface of the extension member and bending radially inwardly when said first shaped end of the clip passes beyond the width of the extension member, said first shaped end of the clip thereby resisting rotational movement of the extension member.

10. The filter assembly of claim 9 wherein the connector portion includes a guide surface which axially receives the extension member.

11. The filter assembly of claim 10 wherein the guide surface is circumferentially adjacent to said first shaped end of the clip.

12. The filter assembly of claim 9 wherein the extension member is an elongate member.

13. The filter assembly of claim 9 wherein the extension member has a second shaped end.

14. The filter assembly of claim 9 wherein the clip engages a portion of the extension member.

15. The filter assembly of claim 9 wherein the clip resists radial separation of the first connector and the second connector.

16. The filter assembly of claim 9 wherein the first connector includes the extension member and the second connector includes the cylindrical connector portion.

17. The filter assembly of claim 9 wherein the connector portion includes a guide surface circumferentially adjacent to said first shaped end of the clip, the guide surface being configured to axially receive the extension member, wherein the extension member is an elongate member and has a second shaped end, and wherein the clip engages a portion of the extension member and includes a lead in edge and a backside edge for contacting the extension member.

18. The filter assembly of claim 17 wherein the first connector includes the extension member and the second connector includes the cylindrical connector portion.

* * * * *